W. E. ELLIOTT.
MULTIPLE SPINDLE DRILL.
APPLICATION FILED JULY 15, 1912.

1,103,180.

Patented July 14, 1914.
4 SHEETS—SHEET 1.

Witnesses
Harold O. Van Antwerp
Ray W. Longfield

Inventor
William E. Elliott
By Luther V. Moulton
Attorney

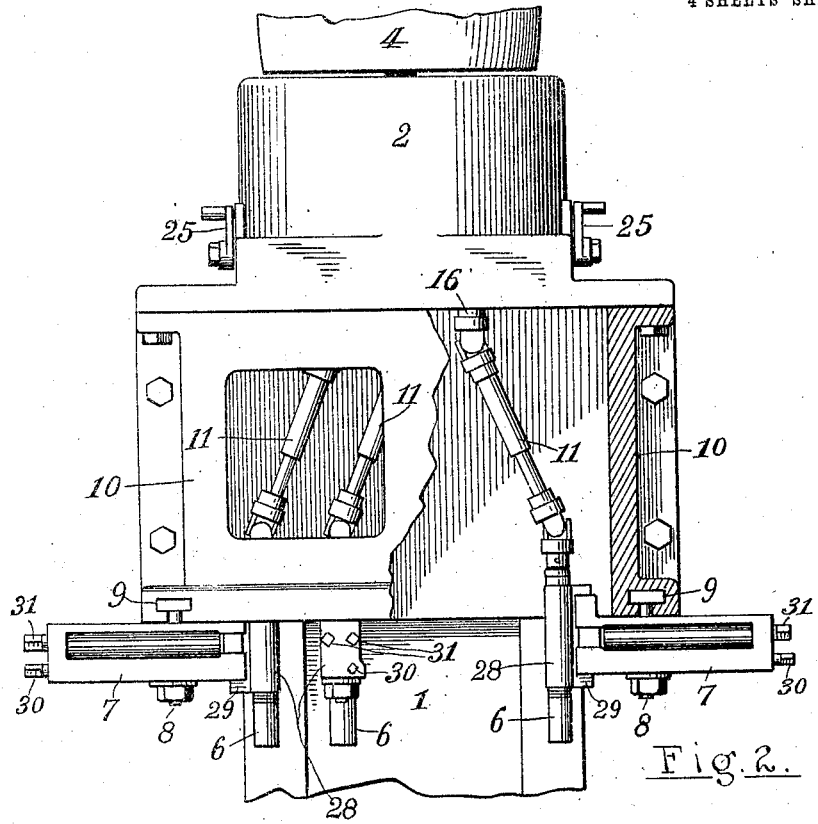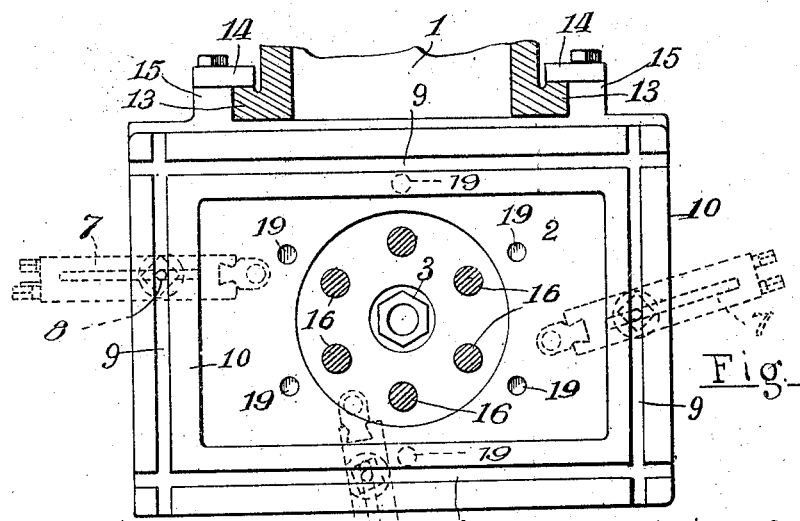

W. E. ELLIOTT.
MULTIPLE SPINDLE DRILL.
APPLICATION FILED JULY 15, 1912.
1,103,180.
Patented July 14, 1914.
4 SHEETS—SHEET 3.
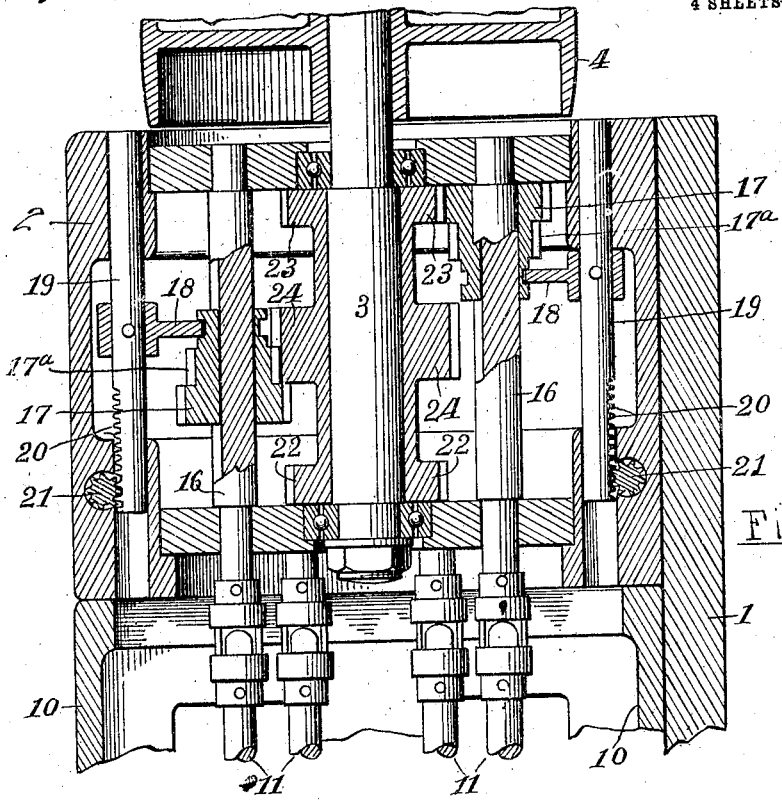
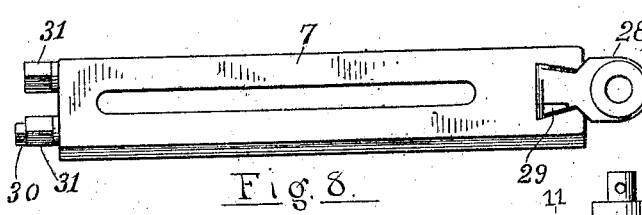
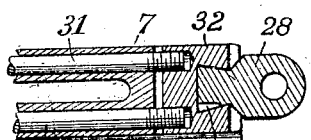
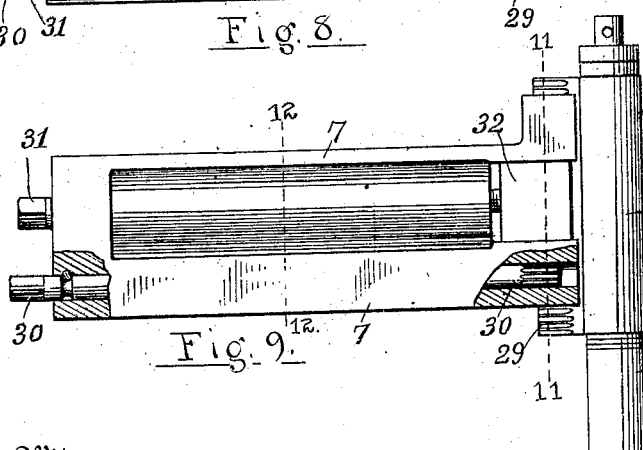
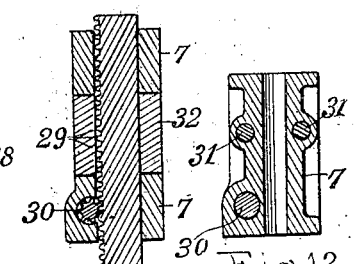
Witnesses
Harold O. Van Antwerp
Ray W. Longfield
Inventor
William E. Elliott
By Luther V. Moulton
Attorney

W. E. ELLIOTT.
MULTIPLE SPINDLE DRILL.
APPLICATION FILED JULY 15, 1912.

1,103,180.

Patented July 14, 1914.
4 SHEETS—SHEET 4.

Witnesses
Harold O. Van Antwerp
Ray W. Longfield

Inventor
William E. Elliott
By Luther V. Moulton
Attorney

UNITED STATES PATENT OFFICE.

WILLIAM E. ELLIOTT, OF GRAND RAPIDS, MICHIGAN.

MULTIPLE-SPINDLE DRILL.

1,103,180. Specification of Letters Patent. Patented July 14, 1914.

Application filed July 15, 1912. Serial No. 709,420.

*To all whom it may concern:*

Be it known that I, WILLIAM E. ELLIOTT, a citizen of the United States of America, residing at Grand Rapids, in the county of Kent and State of Michigan, have invented certain new and useful Improvements in Multiple-Spindle Drills; and I do hereby declare the following to be a full, clear, and exact description of the invention, such as will enable others skilled in the art to which it appertains to make and use the same.

Figure 1:
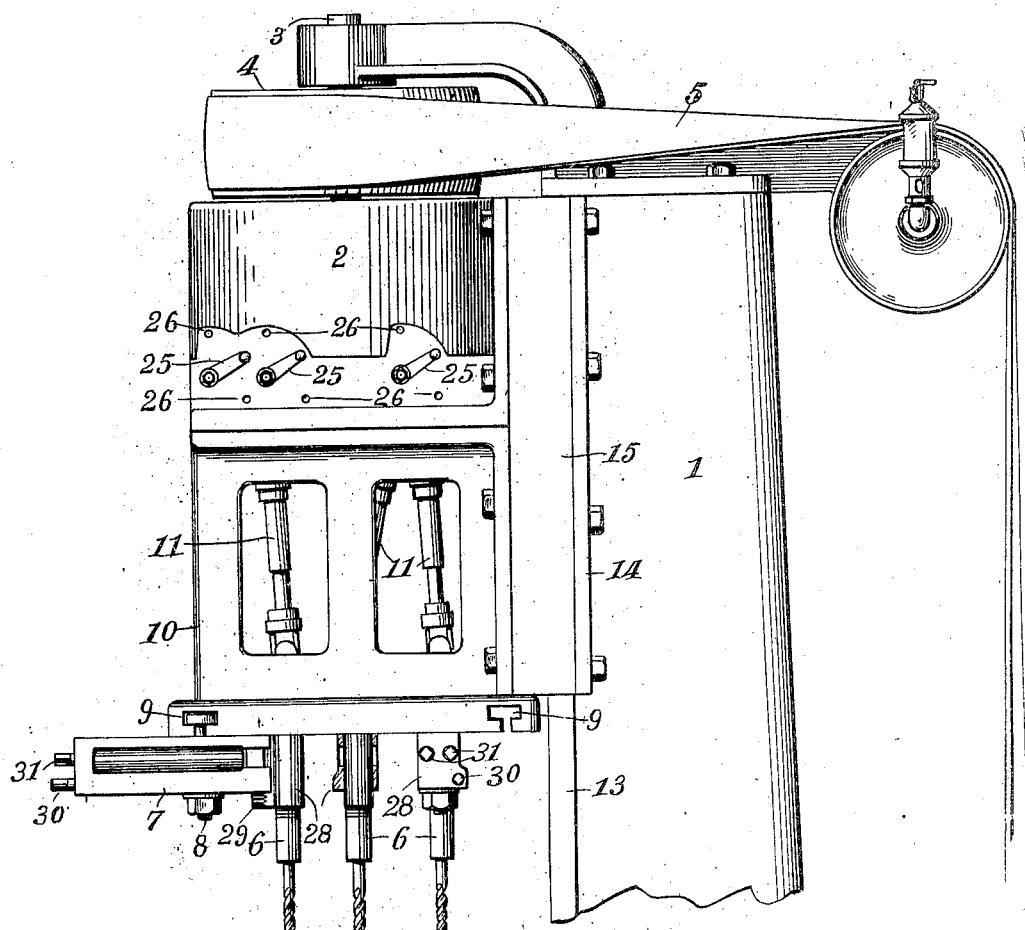
Figure 13:
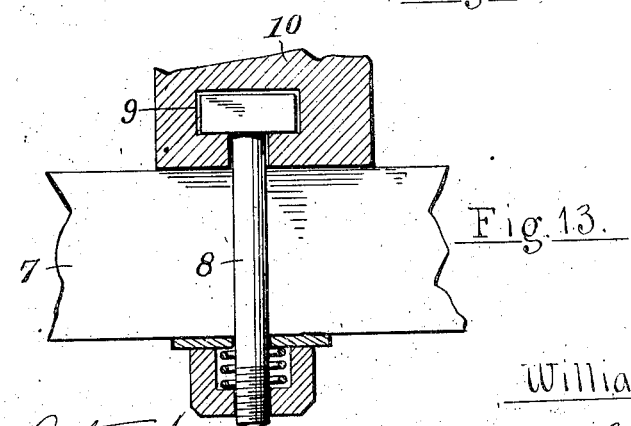
Figure 5:
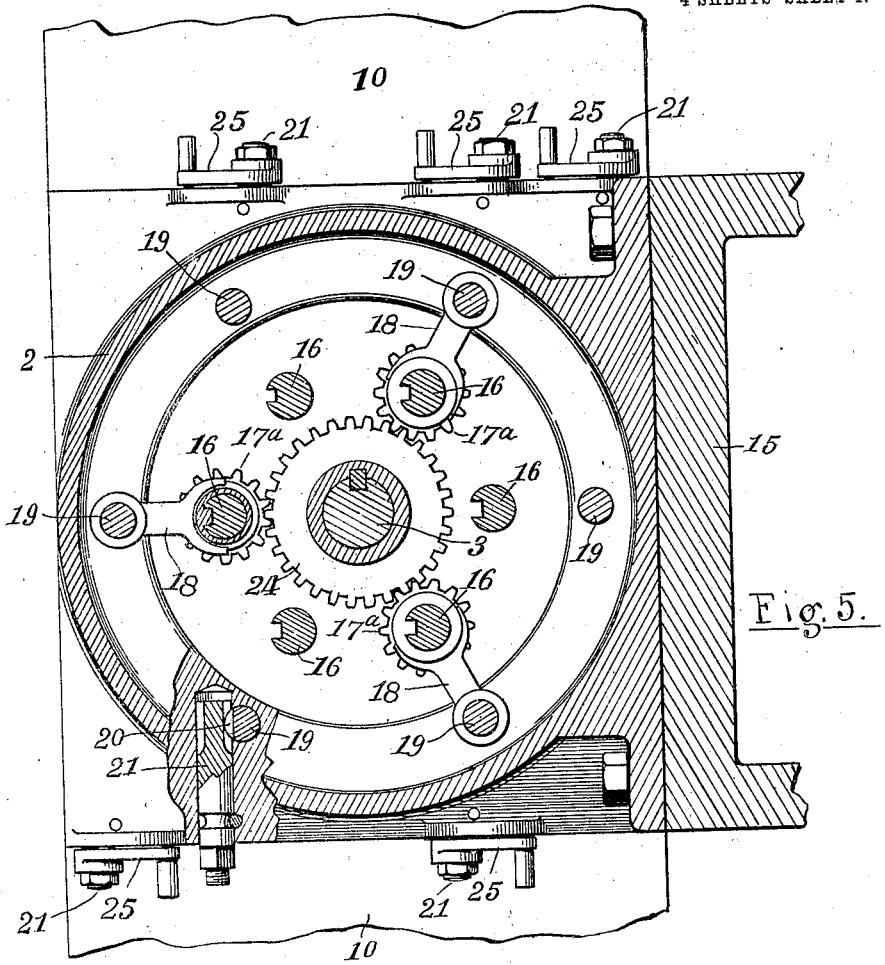
Figure 6:
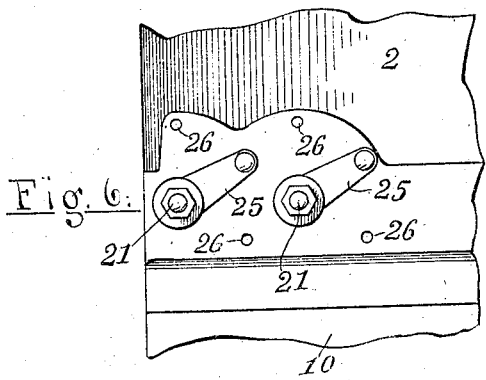
Figure 7:
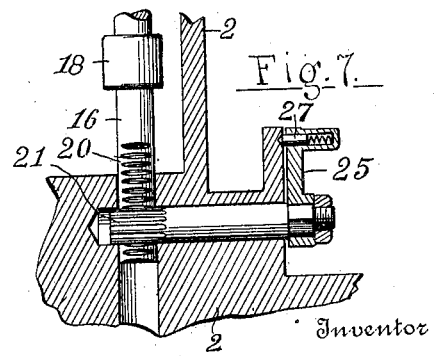

My invention relates to improvements in multiple spindle drills, and its object is to provide improved means for supporting and adjusting the spindles, and to provide the device with various new and useful features hereinafter more fully described and particularly pointed out in the claims, reference being had to the accompanying drawings, in which:

Figure 1 is a side elevation of a portion of a multiple spindle drill embodying my invention; Fig. 2 a front elevation of the same with a portion broken away to show the construction; Fig. 3 is a detail showing an inverted plan view of a portion of the same; Fig. 4 is an enlarged vertical section of the upper part of the device containing the driving mechanism for the spindles; Fig. 5 is a horizontal section of the same with a portion below broken away; Fig. 6 is an enlarged detail in elevation of the levers for adjusting the pinions; Fig. 7 is an enlarged detail in vertical section of a part of the pinion adjusting means; Fig. 8 a plan view of one of the spindle carriers; Fig. 9 a detached side elevation of the same with portions broken away; Fig. 10 a horizontal section of one end of the same; Fig. 11 a vertical section on the line 11—11 of Fig. 9; Fig. 12 the same on the line 12—12 of Fig. 9; and Fig. 13 an enlarged sectional detail of one of the bolts 8 and parts connected thereby.

Like numbers refer to like parts in all of the figures.

1 represent any suitable frame provided with a work support and suitable driving pulleys (not shown): 2 is a gear case arranged in the form of an overhanging head near the top of the frame.

15 are flanges embracing ways 13 on the frame, secured thereto by clamping strips 14, and supporting the gear case and frame.
This gear case is preferably cylindrical and provided with a square base beneath which is supported a rectangular frame 10 to support the spindle holders. In the bottom of the frame are T-slots 9 to receive bolts 8 to adjustably hold various spindle supports 7 each of which comprises an elongated body, illustrated more fully in Figs. 8 to 12 inclusive, each support being provided with a longitudinal slot to receive the bolt. One of these supports is provided for each drill spindle and each independently adjusted upon the frame 4, longitudinally on the bolt, and axially about the same, thus providing for an independent holding and adjustment of each separate spindle. These respective drill spindles 6 are connected to the respective driving shafts 16 by means of telescoping connecting rods 11 having universal joints at their respective ends one connecting one end of the rod to a drill spindle and the other to the respective driving shaft. Each drill spindle 6 is journaled in a bearing 28 provided with a dove-tail rib engaging a dove-tail groove in the end of the support 7 whereby the bearing may be adjusted vertically as occasion requires; for which purpose the rib is provided with a rack 29 engaged by a pinion cut in the end of a shaft 30 journaled in the holder. To secure this bearing rigidly in adjusted position, it is provided with oppositely inclined shoulders engaging opposing shoulders on the end of the support 7 and drawn into rigid engagement therewith by means of bolts 31 extending longitudinally through the support and into a dove-tail block 32 in a recess in the support in which the rib is adjustable. By slacking these bolts the bearing can be adjusted and by tightening the same it is rigidly held on the end of the support in adjusted position.

3 is the main driving shaft journaled in the axis of the case 2 and driven by a pulley 4 on the upper end thereof engaged by a belt 5 operated in the usual way. This main driving shaft is provided with a middle gear 24 of double width of face and gears 22 and 23 near the respective ends. On each shaft 16 are splined two pinions the smaller pinion 17ª adapted to engage the middle gear 24 for the high speed, and the larger pinion 17 adapted to engage one of the end gears 22 or 23 as the case may be, for the lower speed. To permit a large number of the driving shafts in a given space, the gears thereon are arranged in alternate relation whereby on each alternate shaft the gears engage the respective end gear and one part of the teeth adjacent thereto of the middle gear. As shown in Fig. 4, one shaft 16 is shown with the small gear 23 on one shaft engaged by a pinion 17 for slow speed, and a pinion 17ª on another shaft engaging a gear 24 for high speed. These gears and pinions are so spaced apart vertically that the distance between the middle gear 24 and the end gear 22 or 23 is sufficient so that the pinions on any shaft 16 when in mid-position will be out of mesh with any of the gears on the shaft 3 and will not be driven, and when shifted from this mid-position in one direction will engage the small pinion with the middle gear, and when shifted in the other direction will engage the large pinion with one of the end gears on the driving shaft. The shifting of these pinions on the shafts 16 is accomplished by means of slidable shifting rods 19 parallel with the respective shaft 16 and a forked arm 18 mounted thereon engaging a groove in the hub of the pinions on the adjacent shaft 16. Each rod is provided with a rack 20 engaged by a pinion cut in a rock shaft 21 provided with a crank 25. To shift the same, to engage the pinions with the gears, for slow speed, fast speed, and out of action, each crank is provided with a yieldable stop 27 (see Fig. 7) to engage recesses 26 and retain the crank in the three suitable positions. I have shown six spindles only but obviously the number may be increased or decreased as preferred within wide limits. A great variety of adjustments are possible by means of this device the spindles being independently adjustable, each spindle being vertically adjustable and also carried by a respective support independently adjustable in all directions in a horizontal plane. Thus each drill can be adjusted to the desired position to do its work. Each spindle can also be separately run fast or slow or adjusted out of action independent of each of the other spindles.

From the foregoing description the operation of the device can be readily understood without further explanation, it being understood that the work support below the spindle is adapted to be fed upward as the drills enter the work feeding the drills simultaneously as is usual in multiple spindle machines of this class.

What I claim is:—

1. A multiple spindle drill, comprising a frame having a T-slot to receive a bolt, a spindle support having a longitudinal slot to receive the bolt whereby the support is longitudinally and rotatably adjustable on the frame, a bearing vertically adjustable on one end of the support, a block horizontally adjustable in the support and engaging the bearing to hold the same adjusted, a drill spindle journaled in the bearing, and means for rotating the spindle.

2. A multiple spindle drill, comprising a frame, a spindle support adjustably attached to the frame, a block adjustable in the end of the support, screws to adjust the block, a bearing arranged transversely of the end of the support and engaging the same, and a dove-tail rib on the bearing slidably engaging dove-tail grooves in the block and support.

3. A multiple spindle drill, comprising a spindle support consisting of an elongated body having a longitudinal slot to adjustably receive a holding bolt, screws extending longitudinally of the support and engaging a block movable in the end of the support, a bearing having inclined shoulders engaging oppositely inclined surfaces on the end of the support and a dove-tail rib on the bearing slidably engaging a dove-tail groove in the block and support.

In testimony whereof I affix my signature in presence of two witnesses.

WILLIAM E. ELLIOTT.

Witnesses:
 HAROLD O. VAN ANTWERP,
 MAE RANKIN.